(12) United States Patent  (10) Patent No.: US 7,461,497 B2
Ford et al.  (45) Date of Patent: Dec. 9, 2008

(54) SLIP-ON HORSE BOOT WITH REPLACEABLE PASTERN GAITER

(75) Inventors: Garrett N. Ford, Tucson, AZ (US); Dana M. Johnsen, Penticton (CA)

(73) Assignee: Easycare, Inc., Tucson, AZ (US)

( * ) Notice: Subject to any disclaimer, the term of this patent is extended or adjusted under 35 U.S.C. 154(b) by 0 days.

(21) Appl. No.: 11/281,359

(22) Filed: Nov. 17, 2005

(65) Prior Publication Data

US 2006/0064950 A1 Mar. 30, 2006

Related U.S. Application Data

(63) Continuation-in-part of application No. 10/948,584, filed on Sep. 23, 2004, now abandoned, and a continuation-in-part of application No. 10/755,984, filed on Jan. 13, 2004, and a continuation-in-part of application No. 10/910,977, filed on Aug. 4, 2004, now Pat. No. 7,174,858, which is a continuation-in-part of application No. 10/755,945, filed on Jan. 13, 2004, now abandoned.

(60) Provisional application No. 60/506,243, filed on Sep. 26, 2003, provisional application No. 60/635,588, filed on Dec. 13, 2004.

(51) Int. Cl.
 *B68C 5/00* (2006.01)
(52) U.S. Cl. ........................................................ 54/82
(58) Field of Classification Search ..................... 54/82; 119/850, 856; 36/111
 See application file for complete search history.

(56) References Cited

U.S. PATENT DOCUMENTS

| 175,062 | A | * | 3/1876 | Fennell | 54/82 |
| 473,295 | A | | 4/1892 | Coates | |
| 538,685 | A | * | 5/1895 | Larsen | 54/82 |
| 830,403 | A | * | 9/1906 | Barclay | 168/13 |
| 1,434,275 | A | * | 10/1922 | Wozny | 168/1 |

(Continued)

FOREIGN PATENT DOCUMENTS

DE 3223187 A * 12/1983

(Continued)

OTHER PUBLICATIONS

Hoofwings, www.hoofwings.com.*

(Continued)

*Primary Examiner*—Son T. Nguyen
(74) *Attorney, Agent, or Firm*—Antonio R. Durando (57) ABSTRACT

A horse boot (10) includes a shell (12) for a hoof and a gaiter (22) for the pastern. The shell has a sole (14), an upper (16), a tongue (18), and an elastic strap (60) for tightening the upper and the tongue around the hoof of a horse. The gaiter (22) is releasably attached to the upper so as to extend around the rear of the shell and can be wrapped around the pastern (P) of the horse immediately above the hoof's hairline (C) and below the fetlock to function as a barrier against the entry of debris into the shell. The gaiter provides an additional anchor to retain the shell in place under extreme conditions of use. The releasable connection to the shell (12) allows replacement of the gaiter (22) when worn out.

18 Claims, 5 Drawing Sheets

U.S. PATENT DOCUMENTS

| | | | |
|---|---|---|---|
| 3,520,107 A * | 7/1970 | Haryett et al. ............... | 54/82 |
| 5,661,958 A | 9/1997 | Glass et al. | |
| 5,871,458 A * | 2/1999 | Detty ........................ | 602/27 |
| 5,934,599 A | 8/1999 | Hammerslag | |
| D440,363 S | 4/2001 | Ford | |
| 6,526,920 B1 | 3/2003 | Griffin | |

FOREIGN PATENT DOCUMENTS

| | | | |
|---|---|---|---|
| DE | 3811480 A1 * | 9/1989 | |
| EP | 120294 * | 10/1984 | |
| FR | 2216911 | 12/1971 | |
| GB | 1190756 | 5/1970 | |
| GB | 1408336 | 10/1975 | |
| WO | WO 00/54577 * | 9/2000 | |
| WO | WO 2004/047526 | 6/2004 | |

OTHER PUBLICATIONS

Definition of "gaiter" from www.dictionary.com.*
Thomas G. Teskey, The Unfettered Foot: A Paradigm Change for Equine Podiatry, www.easycareinc.com/TheUnfetteredFoot.pdf.

* cited by examiner

SLIP-ON HORSE BOOT WITH REPLACEABLE PASTERN GAITER

REFERENCE TO RELATED APPLICATIONS

This application is based on provisional application No. 60/635,588, filed Dec. 13, 2004, and a continuation-in-part of Ser. No. 10/948,584, filed Sep. 23, 2004 now abandoned, which claims the benefit of provisional application No. 60/506,243 filed Sep. 26, 2003 and is a continuation-in-part of pending Ser. No. 10/755,984, filed Jan. 13, 2004, and a continuation-in-part of Ser. No. 10/910,977, filed Aug. 4, 2004 now U.S. Pat. No. 7,174,858, which is a continuation-in-part of pending Ser. No. 10/755,945, filed Jan. 13, 2004 now abandoned.

BACKGROUND OF THE INVENTION

1. Field of the Invention

The invention relates to boots for horses and, in particular, to a buckle-free horse boot.

2. Description of the Prior Art

Horse boots represent one of many types of protective gear for horses. In particular, boots are used to protect the hooves and fetlocks of horses and are sometimes employed in lieu of horseshoes.

A typical horse boot consists of a sole and an upper integral with or secured to the sole. The upper wraps around the back and the side portions of the boot and, in most cases, it defines an opening for a tongue at the front of the boot. The two sides of the upper are connected over the tongue by laces, a buckle, or other means used to secure the boot on the hoof of the horse. The boot is put on the horse by spreading the upper and the tongue, sliding the hoof of the horse into the boot, and tightening the upper around the hoof. The tongue facilitates the spreading of the upper and thus the process of inserting the hoof in the boot.

Many different kinds of horse boots have been developed over the years in search for a perfect boot that is easy to put on, comfortable to wear, provides the intended protection to the horse's hoof and pastern, and stays on even during the hardest gallop. In fact, all prior-art boots have been deficient in at least some of these objectives because the structural features used to achieve some have been counterproductive with respect to the others.

For instance, easy entry into the boot requires a relatively large tongue opening and flexibility in the upper, features that are inconsistent with the tight fit required to avoid slippage during use. A loose boot also tends to rub against the hoof and pastern and allows debris into the boot, thereby producing irritation or even injury to the horse. After some use, a loose boot is also more likely to come off. Thus, in order to counter these drawbacks, people have endeavored to improve the methods used to secure the boot on the hoof. See, for example, the straps, cables, buckles and lacing systems shown in International Publication No. WO 2004/047526, in U.S. Pat. No. 5,661,958, and in copending U.S. Ser. Nos. 10/948,584, 10/755,984, 10/910,977 and 10/755,945.

The effect of these improved securing means has simply been to provide a tighter fit over the hoof of the horse. As a result, the boot is less likely to come off, but it also forms a rigid enclosure that prevents some of the hoof's physiological functions. It is well known that the hoof of a horse expands when it meets the ground and it contracts when it is raised off the ground. This repeated expansion and contraction of the hoof has the physiological effect of supplementing blood circulation in the hoof and the lower leg of the horse (see T. G. Teskey, "The unfettered foot: a paradigm change for equine podiatry," published at www.easycareinc.com/TheUnfetteredFoot.pdf). The rigid enclosure formed by conventionally tight boots prevents this natural function, it creates discomfort to the horse and it can even cause deformation of the hoof and related injuries during prolonged riding. Furthermore, the tight fit of prior-art boots is still not sufficient to prevent accumulation of dirt and debris inside the boot. So long as an opening forms during use between the upper of the boot and the hoof, sand and other material will continue to penetrate and irritate the horse.

This latter problem has been addressed by extending the height of the upper of the boot over the hoof's hairline, the pastern, or even the fetlock of the horse, but these solutions have necessarily also caused increased rubbing and related irritation. Thus, co-owned Ser. Nos. 10/948,584, 10/910,977 and 10/755,945 introduced the concept of a soft and flexible gaiter or cuff extending from the upper over the pastern of the horse. This solution has helped shield the boot from debris and protect the pastern from excessive rubbing, but is still not ideal with respect to the unnatural constraint over the hoof provided by a rigid securing system. Therefore, a need still exists for the ideal horse boot that is easily installed on the hoof, prevents accumulation of debris, does not irritate the horse, stays in place even during hard use, and permits the physiologically natural blood-circulation function of the hoof.

SUMMARY OF THE INVENTION

The invention expands the protective function of the gaiter disclosed in the copending to also provide a reliable anchor for the rear portion of the boot on the hoof of the horse. Such a gaiter is then combined with a novel restraining device consisting of an elastic strap straddling the upper at the front of the boot.

One aspect of the invention resides in a boot shell with an upper extending upward below the hairline of the hoof of the horse and with a protective gaiter attached to the back portion of the upper. The gaiter consists of a cuff-like structure capable of wrapping around the pastern of the horse from the back of the boot, thereby securing the back of the boot in position, providing a barrier to infiltration of debris from the rear, and preventing the back of the boot from slipping off the hoof during use. The gaiter is made of much softer material than the upper in order to avoid irritation to the pastern of the horse. Thus, the gaiter is necessarily much more subject to wear and tear than the upper and sole of the boot shell, and it is preferably fastened to the upper by detachable connections to enable its convenient replacement when worn out.

Inasmuch as the gaiter is a discrete component of the overall boot structure designed for easy and convenient replacement, the upper and the gaiter are provided with cooperating coupling elements for releasably connecting the gaiter to the boot shell. The coupling elements can include simple screws, complementary elements designed for snap action, or other types of releasable fastening connection.

According to another aspect of the invention, the front of the boot shell is secured in place by an elastic strap straddling over the tongue between the two sides of the upper. While continuously providing a snug closure of the upper around the hoof of the horse, the elastic strap is capable of expanding and contracting as necessary to conform to the natural expansion and contraction of the hoof without ever allowing the boot to become loose. Especially in conjunction with the gaiter attached to the back of the boot, the elastic strap provides sufficient retention to secure the boot in place under all conditions. The elastic strap is preferably also connected to the tongue to provide additional torsional stability when the boot is subjected to strong lateral impacts.

In another embodiment, which is not preferred but is still very useful when a user desires an extremely firm grip on the hoof of the horse, the boot includes a tightening element that engages each front side of the upper, and an operating element for exerting a force on the tightening element so that it progressively tightens the shell around the hoof of the horse. The tightening element is preferably a cable that passes through receiving passages in the upper and is slidable relative thereto.

The preferred operating element consists of a buckle mechanism mounted on the tongue of the boot. Such a mechanism is described in detail copending Ser. No. 10/948,584, herein incorporated by reference.

In a particular embodiment of the horse boot, a gripping element is included on the inside surface of the upper to bear against the side of the hoof and further improve retention of the boot. This gripping element, also described in detail in the aforementioned copending application, has a toothed portion for gripping the hoof of the horse and a removable cover to neutralize its gripping effect, if preferred.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiments and particularly pointed out in the claims. However, such drawings and description disclose only some of the various ways in which the invention may be practiced.

DESCRIPTION OF THE PREFERRED EMBODIMENTS

The advance in the art provided by this invention lies in the performance improvements achieved by using a replaceable gaiter that provides an anchoring function to the back of the boot and an elastic strap that tightens the upper around the front of the hoof in a firm but giving manner. In combination, these novel features make it possible to install the boot with ease, provide a comfortable wear free of debris, prevent accidental loss of the boot, allow the natural circulatory action associated with pressing on and releasing the hoof, and protect the pastern and hairline from irritation and chafing. If the buckle mechanism is used to secure the front of the boot to the hoof, all these advantages are still present except for the enhancement to the physiological blood-circulation function of the hoof.

As used herein, the term "elastic" means capable of stretching when subjected to a tensile force and of contracting to the original condition when such force is released. In view of the fact that most materials exhibit some degree of elasticity, for the purposes of this disclosure and of the claimed invention, the term elastic is limited to materials that can be stretched as described above to at least to 1.4 times their original dimension without rupturing. The term "stretchable" is used to refer to elastic materials, as defined above, that can be elongated at least 1.05 times their original size (that is, they can be stretched at least by 5 percent without loosing elasticity).

Figure 1:
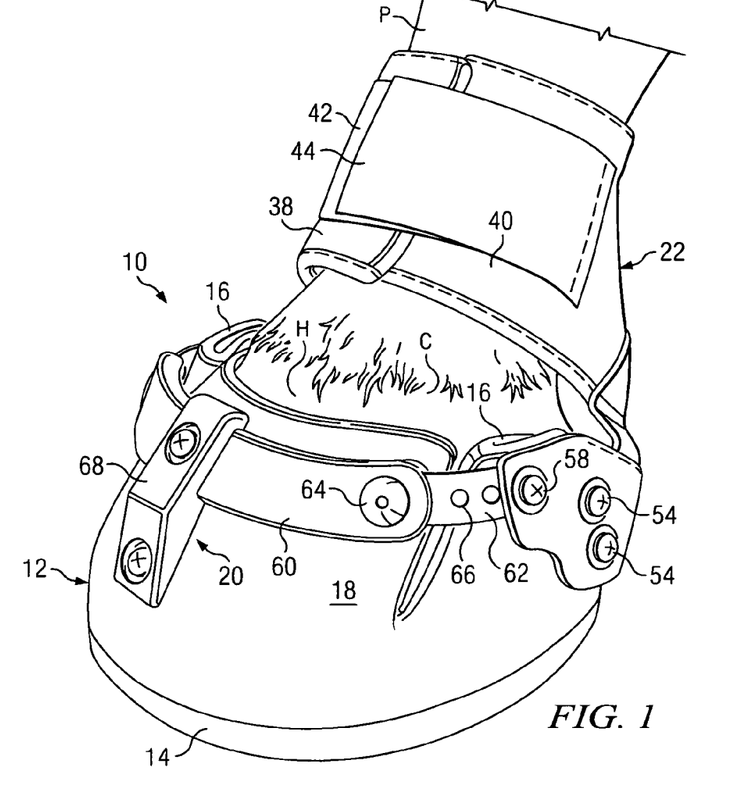
FIG. 1 is a right-side perspective view of the preferred embodiment of the horse boot of the invention, including a substantially rigid shell for receiving the hoof of the horse, an elastic strap for tightening the upper around the hoof, and a gaiter for wrapping around the pastern of the horse to firmly anchor the boot and protect the leg of the horse.

Referring to the figures, wherein like parts are referenced with the same numerals and symbols, FIG. 1 is a perspective view of a horse boot 10 according to the invention shown installed on the hoof of a horse. The horse boot 10 comprises two separate components intended for use in combination. The first component is a conventional boot shell 12, which includes a sole 14, an upper 16 extending upward from the sole, a tongue 18, and a restraining device 20. The second component is a gaiter 22 fastened to the rear portion of the boot shell and extending upward to wrap around the pastern P of the leg of the horse (shown in phantom line).

The boot shell 12 is preferably made of molded plastic and is sized to receive the hoof H of a horse completely below the coronary band C (also referred to as the hoof's hairline). That is, the upper 16 and the tongue 18 are limited in extent to a height that is designed not to overlap the hairline of the hoof intended for the boot of the invention. This feature is important in order to avoid rubbing of the upper and tongue against the hairline, which is the part of the leg where the hoof transitions to a more sensitive region and is susceptible to irritation and possible damage. As shown better in FIG. 2, the upper 16 consists of a peripheral wall which runs along the edge of the sole 14 on the back and the sides of the shell 12 and is secured to the sole in a conventional manner. The upper 16, which is preferably also molded and integral with the sole, defines an opening for receiving the hoof H. The height of the upper at the back of the shell 12 is relatively small and increases towards the front of the shell. The relatively small height of the upper at the back of the shell 12 simplifies insertion of the hoof into the shell from the rear. In addition, as seen clearly in FIG. 2, the rear portion of the upper is projected backward to form a lip 24 that further enlarges the opening for inserting the hoof into the boot shell and also provides a retaining structure for the gaiter 22, as will become clear from the description that follows. A relatively rigid band 26, which may be serrated longitudinally, is anchored to the front of each side of the upper inside the shell and extends around the back to provide rigidity to the lip 24 and correspondingly greater support in securing the hoof around the back of the boot.

Figure 2:
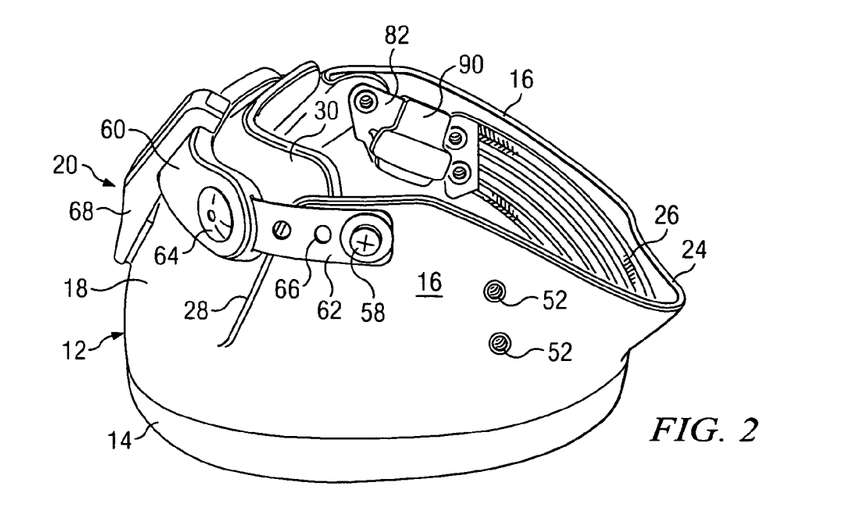
FIG. 2 is a side perspective view of the shell component of the boot of FIG. 1.

The tongue 18, located in the front portion of the shell 12, also extends upward from the sole 14 and is integral with the sole. Separated by the upper 16 by two symmetrical slits 28, the tongue 18 has a free end 30 that is movable in and out of the shell opening defined by the tongue and the upper, thereby facilitating the process of placing a hoof in the shell and also allowing the tongue 18 and the upper 16 to conform to the hoof. The tongue is preferably manufactured as a molded structure integral with the upper and its extent is defined by the slits 28 that separate the top portion of the tongue from the forward edges of the upper. These edges may be folded backward inside the boot to provide a retaining structure for an alternative restraining mechanism used to secure the boot on the hoof, as described below.

Figure 3:
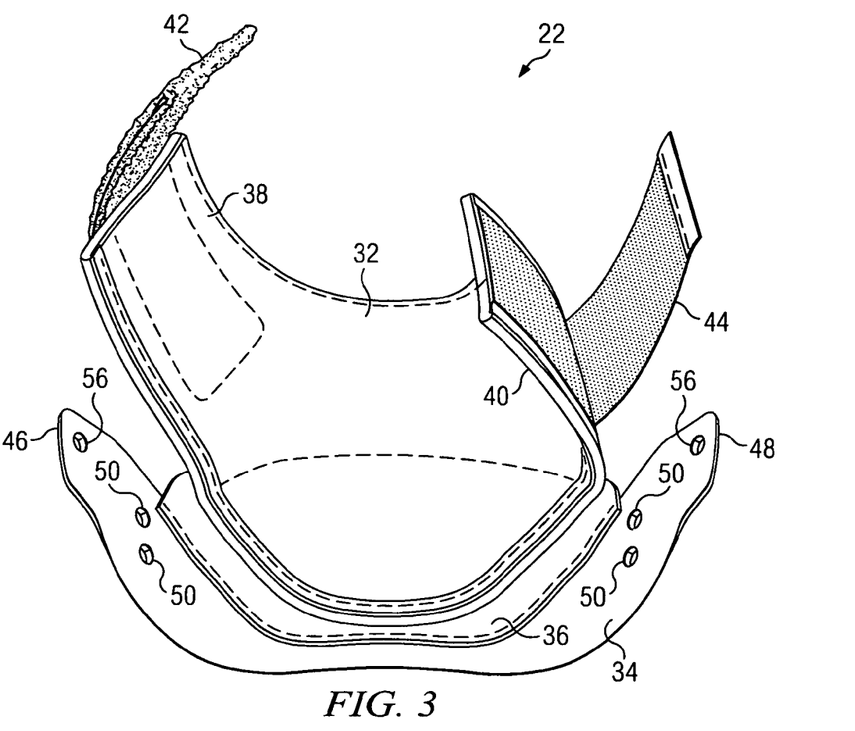
FIG. 3 is a front perspective view of the gaiter component of the boot of FIG. 1.
Figure 4:
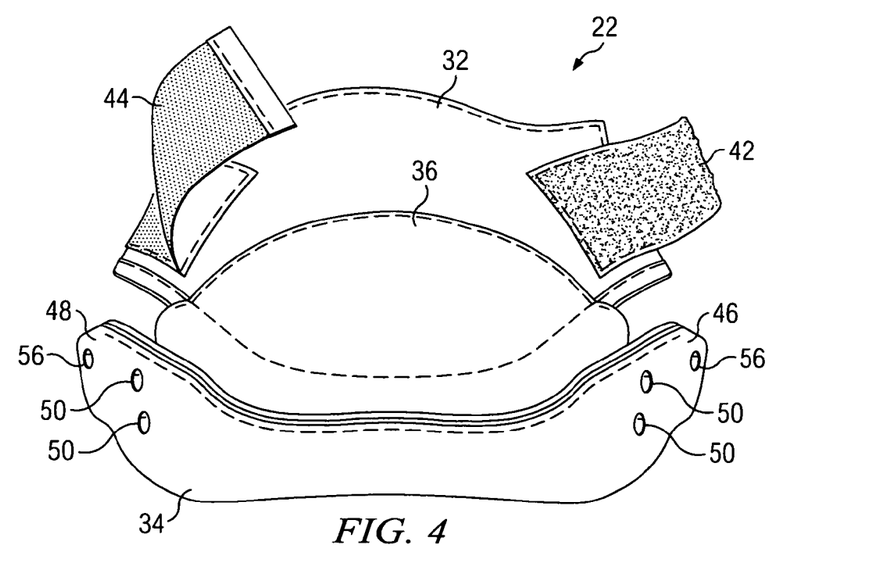
FIG. 4 is a rear perspective view of the gaiter of FIG. 3.
Figure 5:
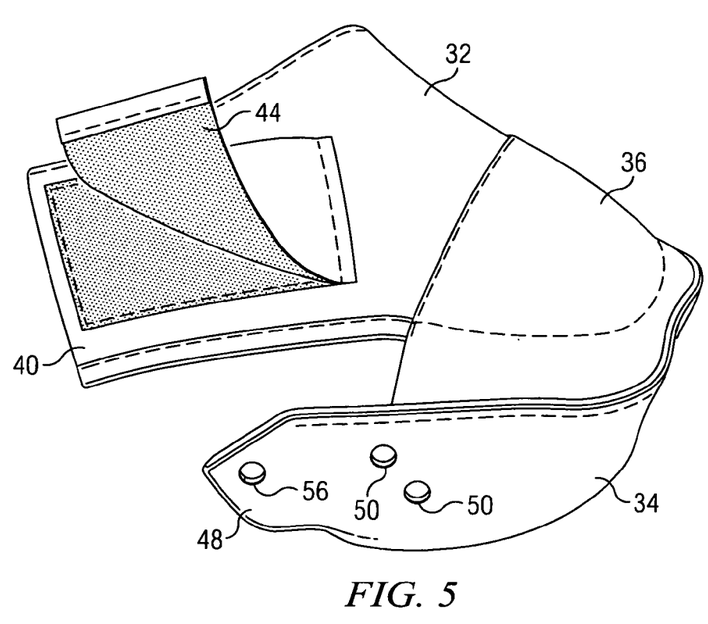
FIG. 5 is a left-side perspective view of the gaiter of FIG. 1.

Referring to FIGS. 3-5, the gaiter 22 of the horse boot 10 is illustrated as a detached, discrete structure. The gaiter 22 includes a wrapping section 32, a mounting section 34, and an intermediate connecting section 36 joining the wrapping and mounting sections to one another. The wrapping section 32 is made of flexible, stretchable material suitable for comfortable wear around the pastern of a horse. The preferred material is neoprene about ⅜ of an inch thick. The wrapping section 32 includes a central portion designed to cover the back of the hoof of the horse and two flaps 38,40 extending forward, so that they can be wrapped around the pastern of the horse above the front hairline of the hoof and below the fetlock. These two features and the texture of the material are important in order to minimize contact of the gaiter with these particularly sensitive areas of the leg of the horse and avoid the irritation, chafing, and other problems caused by totally enveloping gaiters. To the same end, the flaps 38,40 need to be at least 1.5 inches wide in order to minimize the pressure exerted on the pastern of the horse, which obviously increases as the width of the flaps is decreased.

The flaps 38,40 are equipped with coupling means for releasably to fitting the gaiter 22 around the pastern of the horse. In the preferred embodiment of the invention, such coupling means consists of a hook-and-loop fastener comprising two straps 42,44 adapted for layered engagement to provide an adjustable and secure enclosure. For example, as can be clearly understood from the front view of FIG. 3, the first strap 42 attached to flap 38 may be sandwiched between the outer surface of flap 40 and then overlaid with the second strap 44 attached to flap 40. Inasmuch as each contacting surface is provided with appropriately alternating hook-and-loop fastening material, the combination yields a very strong fastener to hold the gaiter 22 firmly wrapped around the pastern of the horse.

The mounting section 34 of the gaiter is designed to be attached to the rear lip 24 of the upper 16 of the boot. As seen better in the rear and side views of FIGS. 4 and 5, the shape of the mounting section 34 conforms to the lip 24 and the sides of the upper 16, so that it can be mounted around them. To this end, the ends 46,48 of the mounting section are provided with two holes 50 that can be aligned with corresponding holes 52 in the upper of the boot for connection my means of two screws 54 (see FIG. 1) that are mated with receiving nuts (not shown) embedded in the upper 16. The ends 46,48 are further provided with another hole 56 that is similarly secured to the upper 16 by another screw 58, which is also used to fasten the folded front edges of the upper and to adjust the tension of the restraining device 20, as described below. The mounting section 34 is preferably made of rigid material, such as plastic, suitable for coupling to the upper of the boot, as described, so as to provide a sturdy and reliable engagement between the gaiter and the shell of the boot.

The connecting section 36 is used to provide a durable transition between the rigid mounting section 34 and the stretchable wrapping section 32. To that end, it is made of a flexible but not stretchable material and it preferably overlaps the back side of the wrapping section, as illustrated in FIG. 4. The material used should advantageously be stronger and more resistant to wear than the material of the wrapping section 32. Suitable materials for the connecting section 36 include leather as well as textiles made from natural and/or synthetic substances. As a result of this configuration, the stretchability of the lower heel portion of the wrapping section 32 is partly limited by the overlapping material of the connecting section 36, but it is also greatly reinforced thereby. The stretchability of the higher heel portion and of the flaps 38,40 of the wrapping section 32 remains unaffected for convenient wrapping and firm securing around the pastern of the horse.

As illustrated in FIG. 1, once coupled to the shell 12, the gaiter 22 provides protection to the heel of the hoof of the horse, preventing infiltration of debris and other irritating material into the horse boot from behind and from most of the sides of the boot, the only portion remaining open being the front half of the hairline C. For best results of protection and ease of wear of the boot, it is recommended that the back side of the gaiter 22 cover at least the entire back of the hoof (that is, at least 180-degree coverage) and that the front side of the gaiter be open over at least two thirds of the front of the hoof (that is, the hairline should be uncovered over a span of at least 120 degrees).

Moreover, and most important as an advance in the art, the attachment of the gaiter 22 to the pastern of the horse provides an anchor that prevents the heel of the hoof from sliding out of the boot shell 12 under even the harshest riding conditions. When the boot is subjected to a strong force tending to strip it from the hoof, the stretchable material of the wrapping section provides sufficient give to temporarily accommodate some loosening of the heel and then retract the boot to its original position. Thus, the boot of the invention could never become totally loose and detached from the hoof, as has been the case with many prior-art boots when they are not very rigidly fastened to the hoof.

It is noted that the gaiter 22 is much more susceptible to wear and tear than the shell 12 of the invention because of the softer and less resistant materials used to provide comfort and stretchability. Therefore, it is by far preferred that the gaiter be attached to the shell 12 by means of connections that can be easily uncoupled, such as screws, snaps, ball-and-socket, tongue-and-groove, channel-and-rod, a hook-and-loop strip, or the like. Accordingly, the gaiter is made replaceable during the life of the horse boot in order to take advantage of the longer useful life of the plastic shell. As the quality of materials improves and materials with durability comparable to that of the shell 12 are developed that provide the described gaiter functions, it is anticipated that the boot of the invention may be manufactured with a permanently attached gaiter.

Figure 6:
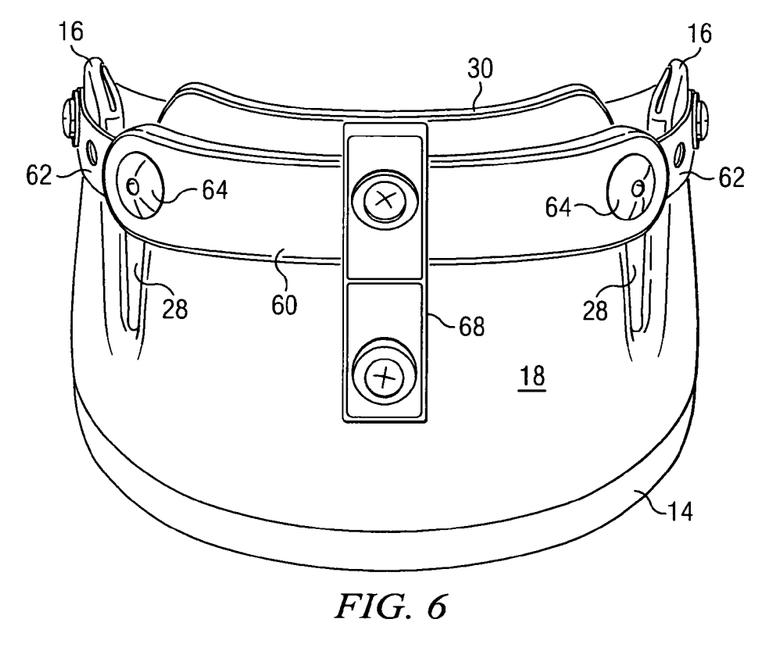
FIG. 6 is a front perspective view of the shell shown in FIG. 2.

Another significant advance in the art provided by this invention lies in the restraining device 20 used in the preferred embodiment of the horse boot. As shown in FIGS. 1 and 2, and also particularly in FIG. 6, such restraining device consists simply of an elastic strap 60 connected to both front sides of the upper 16 over the tongue 18. The strap 60 is judiciously selected to provide sufficient force to fold both the tongue and the sides of the upper against the hoof of the horse, so as to form an enclosure conforming substantially to the size of the hoof inside the boot. The preferred material for the elastic strap 60 is EPDM (ethylene propylene diene monomer) rubber. Since the elastic strap 60 by its very nature is able of stretching or contracting in response to the opposing force provided by the hoof against which the strap presses the upper and the tongue of the boot, the closure of the boot is not rigid like in prior-art lacing or buckling systems. The strap provides a continuously adjusting restraining force that accommodates the natural expansion and contraction of the hoof without loosening the boot's grip on it. As a result, the horse boot of the invention can be used without the loss of circulatory function associated with more rigidly secured prior-art boots.

The elastic strap 60 is preferably connected to the front edges of the upper 16 by means of two perforated strips 62 which provide adjustment to the tension applied by the strap on the upper of the boot. One end of each strip 62 is attached to an end of the elastic strap 60, preferably by a rivet 64 or other fastening means, while the other end is secured to the upper through one of a plurality of perforations 66 in the strip, thereby setting a particular length and corresponding degree of tension in the strap assembly straddling the front of the boot. Preferably, the same screw 58 used to tie the mounting section 34 of the gaiter to the shell of the boot is also used to secure each strip 62 to the upper, as seen clearly in FIGS. 1 and 6. The elastic strap 60 is also preferably attached to the tongue 18 either directly or through a clamp 68, as shown in the figures. This additional attachment distributes equally the tensioning force generated by the strap, thereby providing greater stability of the boot when subjected to torsional forces such as when only one side of the sole of the boot bears on an underlying support.

It is noted that the use of an elastic strap to secure the boot on the hoof of the horse is particularly advantageous in conjunction with the gaiter of the invention, which, by being also attached to the heel of the boot, contributes to the stability of the enclosure secured by the strap. In combination, these two features provide a continually self-adjusting retention mechanism with sufficient give and resiliency to allow the boot to conform to changes in the size and position of the hoof without any risk of loosing the boot or of injuring the horse due to excessive tightness of the boot.

Figure 7:
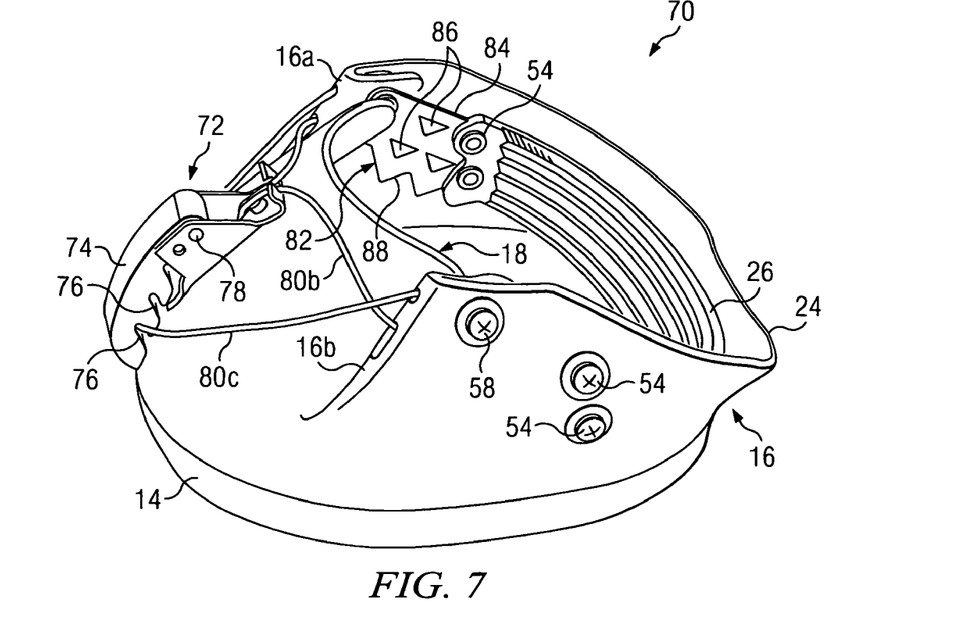
FIG. 7 is a side perspective view of an alternative embodiment of the shell component of the invention, wherein a cable/buckle mechanism is used to secure the boot on the hoof of the horse.
Figure 8:
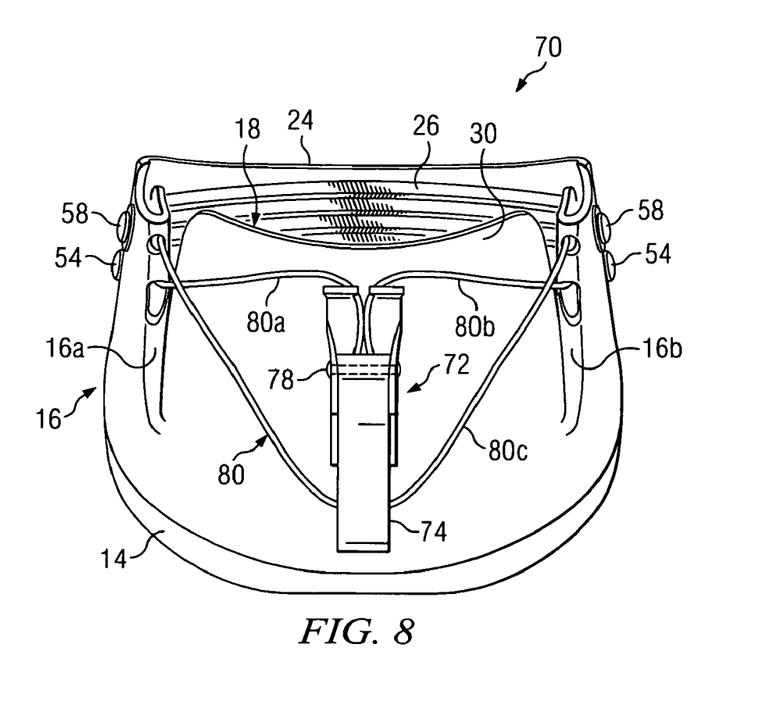
FIG. 8 is a front perspective view of the shell of FIG. 7.
Figure 9:
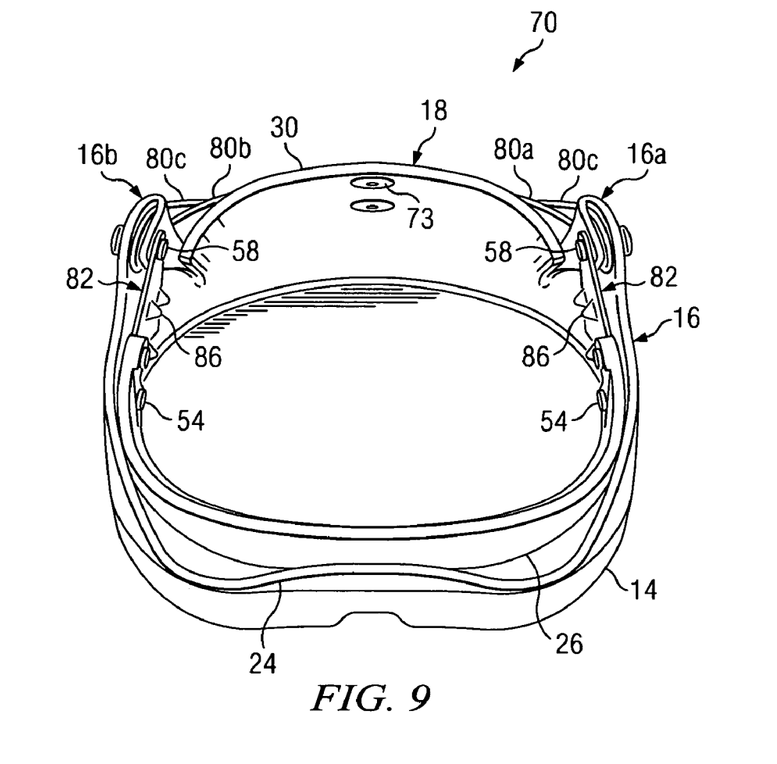
FIG. 9 is a rear perspective view of the shell of FIG. 7.

As mentioned above, though not preferred, a conventional mechanism may be used to provide a tight and rigid connection of the boot shell 12 to the hoof of the horse. Such tightening means may includes a tensioning element in the form of a buckle and a cable or other elongated drawing element that can be tensioned or loosened by the buckle. FIGS. 7-9 illustrate such a buckle mechanism mounted on a boot shell 70 that is substantially the same as the shell 12 of FIGS. 1, 2 and 6 and is similarly suitable for use with the gaiter 22 of the invention, but that also must include a folded front edge on each side of the upper 16 (which is not required for the elastic-strap embodiment). A buckle 72 is mounted on the tongue 18 of the boot by a pair of conventional fasteners 73 (see FIG. 9) and comprises an operating lever 74 formed with a series of slots 76. The lever 74 is pivotable around an axle 78 between a tightened or operative position illustrated in FIGS. 7 and 8 and non-illustrated released or inoperative positions. The lever 74 is adjacent and generally parallel to the tongue 18 in the tightened position and is swung upward from the tongue in the released position.

A cable 80 has two end portions 80a and 80b that are fixed to the top portion of the buckle 72. From the end portion 80a, the cable 80 runs through a first opening in the folded front edge 16a of the right side of the upper 16. The cable 80 then passes around the screw 58 (which is already in place to hold the gaiter—FIG. 1—and to fasten the end of the folded edge of the upper—FIG. 9) and out through a second opening provided in the front edge 16a above the first opening. Similarly, from the end portion 80b, the cable 80 extends to a first opening in the folded front edge 16b of the left side of the upper 16, around the corresponding screw 58 on the left side of the boot, and out through a second opening formed in the edge 16b above the first opening. The segment 80c of the cable runs from the two edges of the upper and is adapted for engagement by one of the slots 76 in the lever 74 of the buckle. Once a hoof has been placed in the boot, pivoting of the lever 74 to the tightened position tensions the cable 42 in conventional way, which, in turn, draws the upper 16 tightly closed around the hoof. The several grooves 76 provided in the buckle allow tightening of the upper 16 around hooves of different circumference.

According to a particular embodiment of the invention, a gripping element 82 may be mounted internally adjacent to the front edges 16a and 16b of the upper, as illustrated in FIGS. 7 and 9. Each gripping element includes a metal plate 84 that extends rearwardly from a location near the respective edge 16a or 16b of the upper partway toward the back of the boot. The metal plates are provided with triangular teeth or projections 86 which protrude to the interior of the boot. Each tooth 86 has a downwardly facing apex that is designed to penetrate and grip a hoof and thereby cause the shell of the boot to sit on the hoof more firmly. The metal plates 84 of the gripping elements have ends with perforations (not shown) that can be used advantageously to secure the plates to the boot using the screws 54 and 58 already in place to fasten the mounting section 34 of the gaiter.

Figure 10:
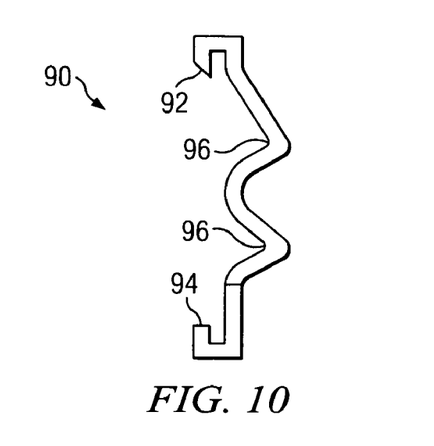
FIG. 10 is a cross-section of a cover for teeth mounted inside the shell of the boot of the invention.

FIG. 10 illustrates in cross-section a removable cover 90 for the gripping element 82. The metal plate 84 of the gripping element has a straight upper edge above the teeth 86 and two lower adjoining triangular protrusions 88 projecting below the teeth. Accordingly, the cover is provided with upper and lower lips 92,94 adapted for snap-on connection over the edges of the metal plate 84. As illustrated, the cover 90 is also shaped with channels 96 for receiving the teeth 86 when the cover is installed. FIG. 2 shows a gripping element with the cover 90 in place.

As is well understood in the art, a horse boot according to either embodiment of the invention is mounted on the leg of a horse to protect the hoof and the legs. The boot is mounted by spreading the tongue 18 forward and the open gaiter 22 backward, thereby maximizing access and facilitating entry of the hoof into the shell 12 of the boot. If the boot includes the elastic strap 60, its elasticity permits the forward extension of the tongue. If the boot is equipped with a buckle 72, entry is carried out with the buckle in released position. The flaps 38,40 of the gaiter are pulled away from one another, the hoof of the horse is lifted and placed inside the shell of the boot with the heel of the hoof against the band 26, and the tongue 18 and the sides of the upper 16 are pushed towards the hoof. No other adjustment is required is the boot is equipped with the elastic band. If a buckle is used, the cable 80 is placed in an appropriate slot of the lever and the buckle is tightened.

Once the shell of the boot has been fastened on the hoof, the flaps 38,40 of the gaiter 22 are pulled around snugly against the pastern of the horse's leg immediately above the hairline of the hoof and below the fetlock. The strap 42 of the gaiter is then secured to the flap 40 and overlaid with the other flap 44, thereby fixing the gaiter 22 on the horse's leg.

As mentioned above, the gaiter serves as a barrier that inhibits the entry of debris into the boot. Furthermore, should the buckle release or the elastic strap relent under extreme forces, the gaiter would prevent the shell of the boot from falling off the hoof.

Should it be necessary or desirable to disconnect the gaiter from the boot shell for replacement of the gaiter or any other reason, this may be readily accomplished by removing screws 54 and 58 from the sides of the upper 16. It is understood that the gaiter has been described as being releasably connected to the shell by way of screws, but other releasable connections can be employed, such as tongue-and-groove, channel-and-rod, ball-and-socket, snaps, or hook-and-loop fasteners.

The height of the portion of the gaiter 22 situated at the rear of the hoof and wrapped about 180 degrees around the pastern is about six inches. The remaining portion of the gaiter, which corresponds essentially to the flaps wrapped around the front of the pastern, is advantageously about three inches tall. These dimensions have been found to avoid overlap of the hairline as well as the fetlock of all average-size horses.

Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

We claim:

1. A horse boot comprising:
   a shell that includes a sole, an upper, and a tongue having a free end extending upward from a front side of the shell;
   a replaceable gaiter attached to the upper of the shell; and
   a restraining mechanism for strapping the shell of the boot on a hoof of a horse;
   wherein the gaiter includes a mounting section for releasable connection of the gaiter to a heel portion of the upper, and a wrapping section with flaps for releasably wrapping around a pastern of the horse, said flaps enclosing the pastern solely above a front hairline and below the a fetlock of the horse, wherein said front hairline is in a gap between a front lower edge of said gaiter and an upper edge of said tongue.

2. The horse boot of claim 1, wherein said mounting section is releasably connected to the heel portion of the upper using screws.

3. The horse boot of claim 1, wherein said wrapping section includes stretchable material.

4. The horse boot of claim 3, wherein said stretchable material is neoprene.

5. The horse boot of claim 1, wherein said flaps of the wrapping section include hook-and-loop straps for securing the gaiter around the pastern of the horse.

6. The horse boot of claim 1, wherein said wrapping section is approximately six inches high around a heel of the hoof and approximately three inches high around a front portion of the hoof of the horse wearing the boot.

7. The horse boot of claim 1, further including a gripping element on an interior surface of the upper to increase retention of the hoof within the shell of the boot.

8. The horse boot of claim 1, wherein said restraining mechanism comprises a buckle and a cable connected to front portions of said upper over the tongue of the shell.

9. The horse boot of claim 1, wherein said mounting section is releasably connected to the heel portion of the upper using screws; said wrapping section includes stretchable neoprene and hook-and-loop straps for securing the gaiter around the pastern of the horse; and the shell includes a gripping element on an interior surface of the upper to increase retention of the hoof within the shell of the boot.

10. A horse boot comprising:
    a shell that includes a sole, an upper, and a tongue, said shell being limited in size to extend everywhere below a hairline of a hoof of a horse wearing the horse boot;
    a gaiter attached to the upper of the shell, said gaiter including a connecting section enclosing a heel portion of the upper around a back portion of said hoof, and including an open wrapping section with flaps for releasably wrapping around and enclosing a pastern of the horse above the hairline and below a fetlock of the horse, said hairline remaining uncovered by said open wrapping section around a front portion of the hoof; and
    a restraining mechanism for strapping the shell of the boot on the hoof of the horse wherein said hairline is in a gap between a front lower edge of said gaiter and an upper edge of said tongue.

11. The horse boot of claim 10, wherein said connecting section encloses the heel portion of the upper over at least 180 degrees around the back portion of the hoof, and said hairline remains uncovered by said open wrapping section over at least 120 degrees around the front portion of the hoof.

12. The horse boot of claim 11, wherein said wrapping section is approximately six inches high around a heel of the hoof and at least one and a half inches high around the front portion of the hoof of the horse wearing the boot.

13. The horse boot of claim 10, wherein said wrapping section includes stretchable material.

14. The horse boot of claim 13, wherein said stretchable material is neoprene.

15. The horse boot of claim 10, wherein said flaps of the wrapping section include hook-and-loop straps for securing the gaiter around the pastern of the horse.

16. The horse boot of claim 10, further including a gripping element on an interior surface of the upper to increase retention of the hoof within the shell of the boot.

17. The horse boot of claim 10, wherein said restraining mechanism comprises a buckle and a cable connected to front portions of said upper over the tongue of the shell.

18. The horse boot of claim 10, wherein said connecting section is releasably connected to the heel portion of the upper; said wrapping section includes stretchable neoprene and hook-and-loop straps for securing the gaiter around the pastern of the horse; and the shell includes a gripping element on an interior surface of the upper to increase retention of the hoof within the shell of the boot.

* * * * *